(12) United States Patent
Guo

(10) Patent No.: US 9,509,344 B1
(45) Date of Patent: Nov. 29, 2016

(54) COMMUNICATION METHOD BASED ON BI-LEVEL BINARY DIGITAL BASEBAND SYMBOLS

(71) Applicant: HUAZHONG UNIVERSITY OF SCIENCE AND TECHNOLOGY, Wuhan, Hubei (CN)

(72) Inventor: Peng Guo, Hubei (CN)

(73) Assignee: Huazhong University of Science and Technology, Wuhan, Hubei (CN)

( * ) Notice: Subject to any disclaimer, the term of this patent is extended or adjusted under 35 U.S.C. 154(b) by 0 days.

(21) Appl. No.: 14/840,937

(22) Filed: Aug. 31, 2015

(30) Foreign Application Priority Data

Jul. 3, 2015 (CN) .......................... 2015 1 0388396

(51) Int. Cl.
*H04L 25/34* (2006.01)
*H04B 1/04* (2006.01)

(52) U.S. Cl.
CPC ....................................... *H04B 1/04* (2013.01)

(58) Field of Classification Search
CPC . H04L 25/4902; H04L 25/4906; H03K 7/00; H03K 7/08; H03K 7/04
USPC .................. 375/238–239, 242, 286–287; 370/212–213
See application file for complete search history.

(56) References Cited

U.S. PATENT DOCUMENTS

| 5,339,333 | A | * | 8/1994 | Zehngut | .............. | H04L 27/1566 |
| | | | | | | 329/301 |
| 5,568,474 | A | * | 10/1996 | Wissman | ............ | H04L 25/4902 |
| | | | | | | 370/294 |
| 2004/0174933 | A1 | * | 9/2004 | Lei | ...................... | H04L 25/4902 |
| | | | | | | 375/238 |

\* cited by examiner

*Primary Examiner* — Khanh C Tran
(74) *Attorney, Agent, or Firm* — Hamre, Schumann, Mueller & Larson, P.C.

(57) ABSTRACT

The invention discloses a communication method using dual-level and binary digital baseband symbols which represents information by durations of a high level and a low level instead of by a high level and a low level in conventional digital baseband symbol design. In the invention, waveforms of a symbol 0 and a symbol 1 are determined according to durations of a high level and a low level, a transmitter generates a corresponding digital baseband signal in terms of a binary data to be transmitted according to the defined waveforms, and a receiver determines a symbol 0 or a symbol 1 according to waveform of a received digital baseband signal. The invention realizes bit synchronization of a receiver and a transmitter without extracting a bit synchronization clock from a received signal by the receiver, and a bit rate thereof is higher than that of Manchester under a same signal bandwidth.

Figure 1:
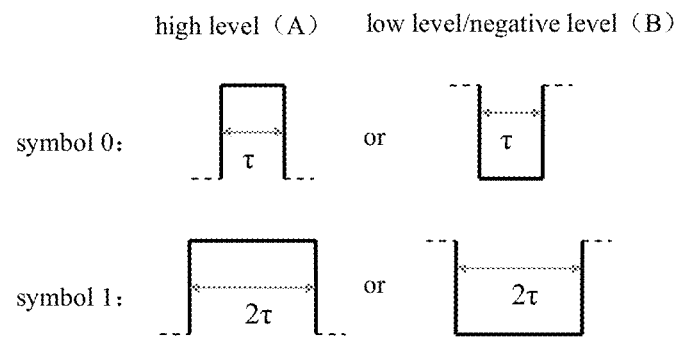

2 Claims, 1 Drawing Sheet high level （A）      low level/negative level （B） symbol 0:  or symbol 1:  or

COMMUNICATION METHOD BASED ON BI-LEVEL BINARY DIGITAL BASEBAND SYMBOLS

FIELD OF THE INVENTION

The invention relates to a technical field of digital communication, and more particularly to a communication method using dual-level and binary digital baseband symbols.

BACKGROUND OF THE INVENTION

Digital baseband communication technology is often used in short-distance wired communication. It is convenient for a transmitter to generate a signal and a receiver to analyze a signal using waveforms of bi-level binary digital baseband symbols as communication signals, so as to simplify requirements of performance of hardwire circuits. Common waveforms of bi-level binary digital baseband symbols comprise: Non-Return to Zero (NRZ), Return to Zero (RZ), Manchester, etc. For NRZ, it is hard for a receiver to accurately determine bit number of a data transmitted by a transmitter for a waveform thereof comprises no bit synchronization clock information, which is inapplicable in practice. For RZ, although a bit synchronization clock is contained therein, it is hard for a receiver to extract bit synchronization signals when a comparatively large number of consecutive 0 is contained in a sending data, which is prone to errors. For Manchester, one symbol is divided into two square waves to provide synchronization signals which results in a comparatively low symbol rate under a same signal bandwidth.

SUMMARY OF THE INVENTION

In view of the above-mentioned problems, it is an objective of the invention to provide a communication method using dual-level and binary digital baseband symbols, which realizes bit synchronization of a receiver and a transmitter without extracting a bit synchronization clock from a received signal by the receiver.

The present invention provides a communication method using dual-level and binary digital baseband symbols, comprising steps of:
(1) determining waveforms of a symbol 0 and a symbol 1, the symbol 0 representing a high level with a duration of $\tau$, or a low or negative level with a duration of $\tau$, the symbol 1 representing a high level with a duration of $k*\tau$, or a low or negative level with a duration of $k*\tau$, where $\tau>0$, $k>0$ and $k \neq 1$;
(2) generating a digital baseband signal corresponding to a binary data to be transmitted according to the waveforms defined in step (1) by a transmitter: as a waveform of a present symbol is a high level, a waveform of a next symbol is a low or negative level, and as a waveform of a present symbol is a low or negative level, a waveform of a next symbol is a high level; and
(3) determining a symbol 0 or a symbol 1 according to the digital baseband signal from the transmitter by a receiver: if $k>1$, a duration of a level of a waveform higher or lower than a predetermined threshold exceeds T, and $\tau<\tau<k\tau$, a corresponding symbol is 1, otherwise a corresponding symbol is 0, and if $0<k<1$, a duration of a level of a waveform higher or lower than the predetermined threshold exceeds T', and $k\tau<T'<\tau$, a corresponding symbol is 0, otherwise a corresponding symbol is 1.

In a class of this embodiment, $k=2$.

Advantages of the invention over prior art comprise:
(1) instead of representing information by a high level o and a low level in a conventional design method of digital baseband symbols, the communication method using dual-level and binary digital baseband symbols of the invention represents information by durations of a high level and a low level, which avoids decrease in transmission efficiency caused by specially introducing a level variation period in a waveform for carrying bit synchronization information in the conventional method.
(2) a bit rate of the invention is higher than that of the Manchester code under a same signal bandwidth.
(3) the invention avoids problems of being difficult to realize bit synchronization in an NRZ code, and to enable bit synchronization due to a comparatively large number of consecutive 0 in an RZ code.

BRIEF DESCRIPTION OF THE ACCOMPANYING DRAWINGS

Figure 2:
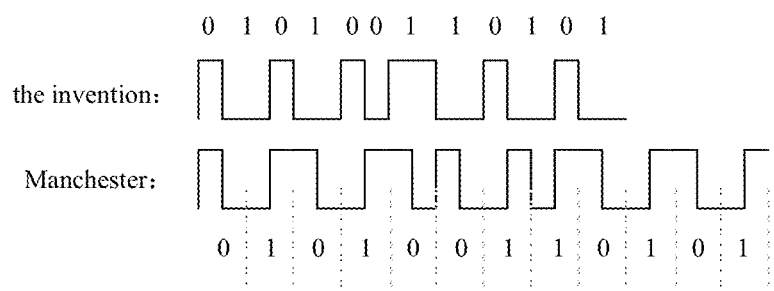

FIG. 1 is a schematic diagram of waveforms of bi-level binary digital baseband symbols according to one embodiment of the present invention; and FIG. 2 is a schematic diagram of a digital baseband signal according to one embodiment of the present invention.

SPECIFIC EMBODIMENTS OF THE INVENTION

For clear understanding of the objectives, features and advantages of the invention, detailed description of the invention will be given below in conjunction with accompanying drawings and specific embodiments. It should be noted that the embodiments are only meant to explain the invention, and not to limit the scope of the invention.

The invention provides a communication method using dual-level and binary digital baseband symbols, comprising steps of:
(1) determining waveforms of a symbol 0 and a symbol 1, the symbol 0 representing a high level with a duration of $\tau$, or a low or negative level with a duration of $\tau$, the symbol 1 representing a high level with a duration of $k*\tau$, or a low or negative level with a duration of $k*\tau$, where $\tau>0$, $k>0$ and $k \neq 1$;
(2) generating a digital baseband signal corresponding to a binary data to be transmitted according to the waveforms defined in step (1) by a transmitter: as a waveform of a present symbol is a high level, a waveform of a next symbol is a low or negative level, and as a waveform of a present symbol is a low or negative level, a waveform of a next symbol is a high level; and
(3) determining a symbol 0 or a symbol 1 according to the digital baseband signal from the transmitter by a receiver: if $k>1$, a duration of a level of a waveform higher or lower than a predetermined threshold exceeds T, and $\tau<\tau<k\tau$, a corresponding symbol is 1, otherwise a corresponding symbol is 0, and if $0<k<1$, a duration of a level of a waveform higher or lower than the predetermined threshold exceeds T', and $k\tau<T'<\tau$, a corresponding symbol is 0, otherwise a corresponding symbol is 1.

The communication method of the invention is illustrated by the following embodiment. Waveforms of the symbol 0 and the symbol 1 are shown in FIG. 1, where a duration of waveform of the symbol 1 is two times that of the symbol 0, namely $k=2$.

Assume a data to be transmitted by the transmitter is 01010011010. A digital baseband signal based on the invention is shown in FIG. 2, and a corresponding digital baseband signal based on symbol waveforms of Manchester is given for comparison.

Specifically, rules of modulation and demodulation are:

Modulation rule: waveform of a symbol should be different from that of an adjacent symbol, namely each symbol selects a waveform of A type or a waveform of B type alternately.

Demodulation rule: check duration of a high/positive level or duration of a low/negative level, and a corresponding symbol is 1 if the duration is greater than a certain threshold, otherwise a corresponding symbol is 0.

Performance Comparison:

According to the invention, transmitting time of each symbol on average is $(1+k)/2$ times of a minimum width of a rectangular pulse (if $k>1$) or $(1+1/k)/2$ times of a minimum width of a rectangular pulse (if $k<1$). While for Manchester, transmitting time of each symbol on average is two times of a minimum width of a rectangular pulse. Therefore, transmitting time of each symbol on average of the invention is $(1+k)/4$ times (if $k>1$) or $(1+1/k)/4$ times (if $k<1$) that of Manchester under a same minimum width of a rectangular pulse, namely the number of bits transmitted per unit time of the invention is $4/(1+k)$ times (if $k>1$) or $4/(1+1/k)$ times (if $k<1$) that of Manchester. When $k=2$, the number of bits transmitted per unit time of the invention is 4/3 times that of Manchester.

In the invention, levels of any two adjacent symbols are different, namely symbols are indicated by levels clearly, therefore there is no need for a receiver to extract a bit synchronization signal and the problem of failing to determine symbol number with consecutive 0 or consecutive 1 does not exist any longer. While preferred embodiments of the invention have been described above, the invention is not limited to disclosure in the embodiments and the accompanying drawings. Any changes or modifications without departing from the spirit of the invention fall within the scope of the invention.

What is claimed is:

1. A communication method using dual-level and binary digital baseband symbols, comprising steps of:
    (1) determining waveforms of a symbol 0 and a symbol 1, said symbol 0 representing a high level with a duration of $\tau$, or a low or negative level with a duration of $\tau$, said symbol 1 representing a high level with a duration of $k*\tau$, or a low or negative level with a duration of $k*\tau$, where $\tau>0$, $k>0$ and $k\neq1$;
    (2) generating a digital baseband signal corresponding to a binary data to be transmitted according to said waveforms defined in step (1) by a transmitter: as a waveform of a present symbol is a high level, a waveform of a next symbol is a low or negative level, and as a waveform of a present symbol is a low or negative level, a waveform of a next symbol is a high level; and
    (3) determining a symbol 0 or a symbol 1 according to said digital baseband signal from said transmitter by a receiver:
        if $k>1$, a level of a waveform is higher or lower than a predetermined threshold, and a duration of the level of the waveform exceeds T, a corresponding symbol is 1, wherein $\tau<T<k\tau$; otherwise a corresponding symbol is 0, and
        if $0<k<1$, a level of a waveform is higher or lower than said predetermined threshold, and a duration of the level of the waveform exceeds T', a corresponding symbol is 0, wherein $k\tau<T'<\tau$; otherwise a corresponding symbol is 1.
2. The communication method of claim 1, wherein $k=2$.

* * * * *